United States Patent
Adar et al.

(10) Patent No.: US 7,747,803 B2
(45) Date of Patent: Jun. 29, 2010

(54) DEVICE, SYSTEM, AND METHOD OF HANDLING DELAYED TRANSACTIONS

(75) Inventors: Etai Adar, Yokne'am Ilit (IL); Michael Bar-Joshua, Haifa (IL); Atar Peyser, Haifa (IL); Shaul Yifrach, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 11/946,102

(22) Filed: Nov. 28, 2007

(65) Prior Publication Data

US 2009/0138641 A1    May 28, 2009

(51) Int. Cl.
*G06F 13/00* (2006.01)
*G06F 13/14* (2006.01)
*G06F 3/00* (2006.01)

(52) U.S. Cl. .................. 710/110; 710/36; 710/60; 710/240; 710/260; 710/107; 709/226; 719/321; 719/327

(58) Field of Classification Search ................ 710/110, 710/240–244
See application file for complete search history.

(56) References Cited

U.S. PATENT DOCUMENTS

| 5,668,947 | A | * | 9/1997 | Batcher ................... 714/30 |
| 5,761,446 | A | | 6/1998 | Donley et al. |
| 5,896,539 | A | | 4/1999 | Arimilli et al. |
| 5,935,234 | A | * | 8/1999 | Arimilli et al. ............. 710/244 |
| 5,941,967 | A | | 8/1999 | Zulian |
| 6,269,428 | B1 | * | 7/2001 | Carpenter et al. .......... 711/150 |
| 6,938,114 | B2 | * | 8/2005 | Foster et al. ............... 710/200 |
| 7,076,719 | B2 | | 7/2006 | Anjo et al. |
| 7,120,714 | B2 | * | 10/2006 | O'Connor et al. .......... 710/243 |
| 7,191,244 | B2 | * | 3/2007 | Jennings et al. ............ 709/231 |
| 7,231,445 | B1 | * | 6/2007 | Aweya et al. ............... 709/226 |
| 7,558,923 | B1 | * | 7/2009 | Bennett et al. ............. 711/144 |
| 2004/0215947 | A1 | | 10/2004 | Ward et al. |
| 2009/0177822 | A1 | * | 7/2009 | Adar et al. ................. 710/110 |

* cited by examiner

*Primary Examiner*—MarK Rinehart
*Assistant Examiner*—Brian T Misiura
(74) *Attorney, Agent, or Firm*—Eitan, Mehulal, Pappo, Kugler; Suzanne Erez

(57) ABSTRACT

Device, system, and method of handling delayed transactions. For example, an apparatus to handle delayed transactions in a computing system includes: a slave unit adapted to pseudo-randomly reject a request received from a master unit.

3 Claims, 3 Drawing Sheets

DEVICE, SYSTEM, AND METHOD OF HANDLING DELAYED TRANSACTIONS

FIELD OF THE INVENTION

Some embodiments of the invention are related to the field of computing, and more particularly to communication among multiple master units and a slave unit.

BACKGROUND OF THE INVENTION

A computer system may include a delayed-transaction slave unit connected through a common pipeline (e.g., a Processor Local Bus (PLB)) to multiple master units. The slave unit may be able to support a first number of outstanding requests; whereas one or more master units may send to the slave unit a second, larger, number of requests (e.g., substantially concurrently). For example, the slave unit may be able to support a single outstanding read request; whereas two master units may attempt to read data from the slave unit. Optionally, an arbiter may be used to manage multiple pipelined requests originating from the multiple master units.

The first master unit may send a read request, which may be rearbitrated and accepted (e.g., acknowledged) by the slave unit, thereby becoming a delayed transaction. Based on the accepted read request, data may be transferred from the slave unit over the common pipeline to the first master unit. The data transfer typically involves a network delay time, e.g., a substantially constant network delay. During the network delay, the second master unit may send a read request, which may be rearbitrated and rejected (e.g., not acknowledged), since the slave unit is concurrently handling the read transaction of the first master unit.

Upon completion of the read transaction of the first master unit, the first master unit may send another read request, which again may be rearbitrated and accepted (e.g., acknowledged), thereby becoming another delayed transaction. During the network delay associated with that delayed transaction, the second master unit may send another read request, which again may be rearbitrated and rejected (e.g., not acknowledged), since the slave unit is concurrently handling the second read transaction of the first master unit This sequence of operations may repeat, and the second master may be "starved" or "live-locked", namely, may not receive data from the slave unit for a long period of time. This may occur, for example, if the time required for a network round-trip between the first master unit and the slave unit, is an integer multiple of the time required for an arbitration process (e.g., measured in PLB cycles). Once the data is read by the first master unit and the slave unit is freed to handle another request, the next transaction to be accepted is a further read request from the first master unit. The second master unit is thus "starved", even though the arbiter operated according to a "fair" arbitration scheme.

SUMMARY OF THE INVENTION

Some embodiments of the invention include, for example, devices, systems, and methods of handling delayed transactions.

Some embodiments include, for example, an apparatus to handle delayed transactions in a computing system, the apparatus including a slave unit adapted to pseudo-randomly reject a request received from a master unit.

In some embodiments, a method for handling delayed transactions in a computing system includes: pseudo-randomly rejecting a request received by a slave unit from a master unit.

In some embodiments, a system to handle delayed transactions in a computing platform includes a slave unit connected to a master unit through a common pipeline, wherein the slave unit is adapted to pseudo-randomly reject a request received from the master unit.

Some embodiments include, for example, a computer program product including a computer-useable medium including a computer-readable program, wherein the computer-readable program when executed on a computer causes the computer to perform methods in accordance with some embodiments of the invention.

Some embodiments of the invention may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
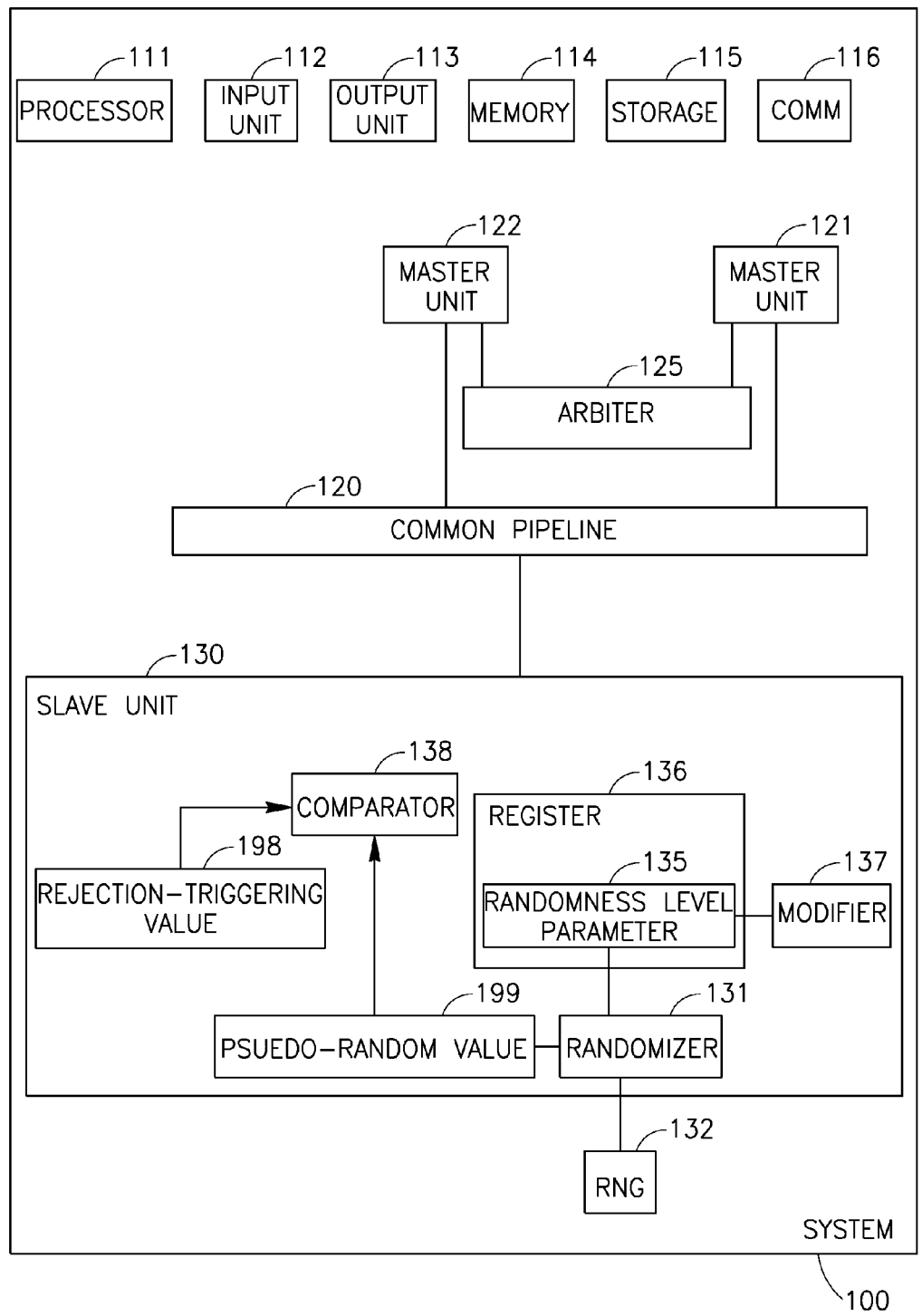
FIG. 1 is a schematic block diagram illustration of a system able to handle delayed transactions in accordance with a demonstrative embodiment of the invention.

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein includes, for example, "multiple" or "two or more". For example, "a plurality of items" includes two or more items.

The term "random" as used herein includes, for example, random, pseudo-random, unpredictable and/or haphazard. The term "pseudo-random" as used herein includes, for example, random, pseudo-random, unpredictable and/or haphazard. The terms "random" and/or "pseudo-random" as used herein may relate, for example, to one or more items or numbers that lack order, that lack predictability, that lack a definitive pattern, that are haphazard or appear to be haphazard, that are generated or produced by a process whose output does not follow a describable pattern or a deterministic pattern, that do not follow a deterministic rule, that appear to not follow a deterministic rule, that appear to be chaotic or disorganized, or the like.

Although portions of the discussion herein relate, for demonstrative purposes, to wired links and/or wired communications, embodiments of the invention are not limited in this regard, and may include one or more wired or wireless links, may utilize one or more components of wireless communication, may utilize one or more methods or protocols of wireless communication, or the like. Some embodiments of the invention may utilize wired communication and/or wireless communication.

Although portions of the discussion herein relate, for demonstrative purposes, to read transactions requested by master unit(s) and/or performed by a slave unit, embodiments of the invention are not limited in this regard, and may be used in conjunction with other types of transactions, for example, write transactions requested by master unit(s) and/or performed by a slave unit, processing transactions requested by master unit(s) and/or performed by a slave unit, or the like.

Although portions of the discussion herein relate, for demonstrative purposes, a common pipeline such as, for example, a bus or a PLB, embodiments of the invention are not limited in this regard, and may be used in conjunction with other types of mediums, for example, wired links, wireless links, shared access mediums, systems in which multiple agents or clients compete on services provided by a resource, or the like.

Although portions of the discussion herein relate, for demonstrative purposes, to a slave unit able to support a single outstanding request, embodiments of the invention are not limited in this regard, and may be used in conjunction with a slave unit able to support or handle multiple outstanding requests. In some embodiments, for example, the number of outstanding requests that the slave unit is able to support or handle is smaller than the total number of requests that are outstanding, e.g., received from one or more master units. In some embodiments, for example, the number of outstanding requests that the slave unit is able to support or handle, is smaller than the number of master units or agents that access or attempt to access the slave unit (e.g., substantially in parallel, substantially concurrently, substantially simultaneously, during time periods that at least partially overlap, or the like).

Although portions of the discussion herein relate, for demonstrative purposes, to two master units connected to a single slave unit, embodiments of the invention are not limited in this regard, and may be used in conjunction another number of master units (e.g., one or more master units), which may be optionally connected to another number of slave unit(s). For example, in some embodiments, the number of concurrently outstanding requests, that originate from one or more master units (e.g., substantially in parallel, substantially concurrently, substantially simultaneously, during time periods that at least partially overlap, or the like), is greater than the number of outstanding requests that the slave unit(s) may be able to support or handle.

The terms "slave" or "slave unit" as used herein includes, for example, a resource, a delayed-transaction resource, a local resource, a remote resource, a resource able to fulfill read requests, a resource able to fulfill write requests, a resource able to fulfill other requests (e.g., requests to perform processing operations), a data serving unit, a server, or the like. For example, in some embodiments, a slave unit may include a hard-disk, a storage unit, a mass storage unit, a Network Interface Card (NIC), or other unit or resource.

The term "master" or "master unit" as used herein includes, for example, a client unit, an agent unit, a local client or agent, a remote client or agent, a client or agent able to send access requests (e.g., read requests, write requests, requests to perform processing operations), or the like. For example, in some embodiments, a master unit may include a processor, a controller, a graphics card, or other unit or agent.

At an overview, some embodiments of the invention allow efficient operation of a delayed-transaction slave unit which is connected to multiple master units over a common pipeline (e.g., a communication bus). The delayed-transaction slave unit utilizes a scheme which includes a random or pseudo-random mechanism in order to avoid live-lock of a master unit. For example, randomly or pseudo-randomly, in response to a read request of a first master unit, the slave unit responds with re-arbitration and negative acknowledgement, although the slave unit has a free resource and is able to respond with re-arbitration and acknowledgment. Accordingly, based on a random or pseudo-random mechanism, the slave unit does not accept a transaction as a delayed transaction, even though the slave unit has free resource(s) and is able to accept the transaction as a delayed transaction. As a result, "starvations" or "live-locks" of a master unit are avoided or become infrequent.

The random or pseudo-random mechanism is implemented, for example, using a free-running Cyclic Redundancy Check (CRC) generator. The level of randomness or pseudo-randomness is preset in accordance with specific implementation requirements, for example, by setting the number of bits of the free-running CRC generator utilized by the random or pseudo-random mechanism of the slave unit. For example, utilization of one bit of the CRC generator provides randomness or pseudo-randomness of 50 percent; utilization of two bits of the CRC generator provides randomness or pseudo-randomness of 25 percent; utilization of three bits of the CRC generator provides randomness or pseudo-randomness of 12.5 percent; or the like.

FIG. 1 schematically illustrates a block diagram of a system 100 able to handle delayed transactions in accordance with some demonstrative embodiments of the invention. System 100 may be or may include, for example, a computing device, a computer, a Personal Computer (PC), a server computer, a client/server system, a mobile computer, a portable computer, a laptop computer, a notebook computer, a tablet computer, a network of multiple inter-connected devices, or the like.

System 100 may include, for example, a processor 111, an input unit 112, an output unit 113, a memory unit 114, a storage unit 115, and a communication unit 116. System 100 may optionally include other suitable hardware components and/or software components.

Processor 111 may include, for example, a Central Processing Unit (CPU), a Digital Signal Processor (DSP), one or more processor cores, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 111 may execute instructions, for example, of an Operating System (OS) (not shown in drawings) of system 100 or of one or more software applications (not shown in drawings) tangibly embodied within system 100.

Input unit 112 may include, for example, a keyboard, a keypad, a mouse, a touch-pad, a track-ball, a stylus, a microphone, or other suitable pointing device or input device. Output unit 113 may include, for example, a monitor, a screen, a Cathode Ray Tube (CRT) display unit, a Liquid Crystal Display (LCD) display unit, a plasma display unit, one or more audio speakers, or other suitable output devices.

Memory unit 114 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units or storage units. Storage unit 115 may include, for example, a hard disk drive, a floppy disk drive, a Compact Disk (CD) drive, a CD-ROM drive, a Digital Versatile Disk (DVD) drive, or other suitable removable or non-removable storage units. Memory unit 114 and/or storage unit 115 may, for example, store data processed by system 100.

Communication unit 116 may include, for example, a wired or wireless Network Interface Card (NIC), a wired or wireless modem, a wired or wireless receiver and/or transmitter, a wired or wireless transmitter-receiver and/or transceiver, a Radio Frequency (RF) communication unit or transceiver, or other units able to transmit and/or receive signals, blocks, frames, transmission streams, packets, messages and/or data. Optionally, communication unit 116 may include, or may be associated with, one or more antennas, for example, a dipole antenna, a monopole antenna, an omni-directional antenna, an end fed antenna, a circularly polarized antenna, a micro-strip antenna, a diversity antenna, or the like.

In some embodiments, the components of system 100 may be enclosed in a common housing, packaging, or the like, and may be interconnected or operably associated using one or more wired or wireless links. In other embodiments, components of system 100 may be distributed among multiple or separate devices or locations, may be implemented using a client/server configuration, may communicate using remote access methods, or the like.

System 100 includes multiple master units, for example, a master unit 121 and a master unit 122, which are connected to a slave unit 130 though a common pipeline 120 (e.g., a PLB). Master unit 121 and/or master unit 122 include, for example, a processor, a controller, a graphics card, or other unit or agent. Master unit 121 and/or master unit 122 are able, for example, to request read transactions from slave unit 130, to request write transactions from slave unit 130, to request processing transactions from slave unit 130, or the like.

The slave unit 130 includes, for example, a hard disk drive, a Network Interface Card (NIC), or other common resource or shared resource able to provide services to master units 121 and/or 122, or able to fulfill read requests, write requests and/or processing requests of master units 121 and/or 122. In some embodiments, slave unit 130 is able to support a single outstanding request, and does not support multiple concurrently-outstanding requests.

The common pipeline 120 includes, or is associated with, an arbiter 125, for example, an arbitration circuit, an arbitration controller, or other arbitration logic. The arbiter 125 is able to determine and/or grant usage rights or access rights with respect to common pipeline 120 and/or slave unit 130. The arbiter 125 is able to allow one or more (e.g., concurrent) pipelined requests across the common pipeline 120. The arbiter 125 utilizes a "fair usage" scheme, such that an access granted to master unit 121 is followed by an access granted to master unit 122, and vice versa.

In accordance with some embodiments of the invention, the slave unit 130 utilizes a randomization scheme in order to avoid "starvation" or "live-lock" of master units 121 and/or 122. For example, slave unit 130 may include, or may be associated with, a randomizer 131 able to determine whether or not to perform an operation, based on random or pseudo-random number(s). The randomizer 131 may utilize random or pseudo-random numbers or bits, for example, obtained from a Random Number Generator (RNG) 132. In some embodiments, the RNG 132 may be, for example, a 16-bit free-running CRC generator. In some embodiments, the RNG 132 may be or may include, for example, a pseudo-random number generator, a 16-bit free-running CRC generator, or other hardware unit and/or software unit able to generate random or pseudo-random values (e.g., numbers, bits, bytes, sequences of bits, bit-stream, or the like).

The randomizer 131 may determine, randomly or pseudo-randomly, that in response to a read request from master unit 121, the slave unit 130 respond with re-arbitration and negative acknowledgement, although the slave unit 130 has a free resource and is able to respond with re-arbitration and acknowledgment. Accordingly, based on the random or pseudo-random input from the randomizer 131, from time to time (namely, randomly or pseudo randomly) the slave unit 130 does not accept a transaction as a delayed transaction, even though the slave unit 130 has free resource(s) and is able to accept the transaction as a delayed transaction. As a result, "starvations" or "live-locks" of master units 121 and/or 122 are avoided or become infrequent.

In some embodiments, for example, randomizer 131 may include or may utilize a comparator 138, which compares between a pseudo-random value 199 obtained from the RNG 132, and a pre-defined value (or multiple pre-defined values) that triggers rejection of requests (e.g., a rejection-triggering value 198). For example, if the comparator 138 determines that the pseudo-random value 199 obtained from the RNG 132 is equal to the pre-defined rejection-triggering value 198, then the comparator 138 outputs a "true" value (indicating a positive comparison result), and randomizer 131 may indicate to slave unit 130 to reject the request, even if slave unit 130 has one or more available resources to handle the request. In contrast, if the comparator 138 determines that the pseudo-random number 199 obtained from the RNG 132 is not equal to the pre-defined rejection-triggering value 198, then the comparator 138 outputs a "false" value (indicating a negative comparison result), and randomizer 131 may indicate to slave unit 130 to accept the request (e.g., if slave unit 130 has one or more available resources to handle the request). Other comparison mechanisms may be used.

In some embodiments, the random or pseudo-random mechanism utilizes one or more bits obtained from the RNG 132. The level of randomness or pseudo-randomness may be set or preset in accordance with specific implementation requirements, for example, by setting the number of bits of the RNG 132 that are utilized by the randomizer 131 of slave unit 130. For example, utilization of one bit obtained from the RNG 132 provides randomness of 50 percent; utilization of two bits obtained from the RNG 132 provides randomness of 25 percent; utilization of three bits obtained from the RNG 132 provides randomness of 12.5 percent; and the like.

In some embodiments, the level of randomness or pseudo-randomness utilized by slave unit 130 may be set, pre-set, modified, and/or dynamically modified using a randomness level parameter 135, for example, stored in a register 136 which may be included in slave unit 130 or may be associated with slave unit 130. In some embodiments, the value of the randomness level parameter 135 may be pre-set, hard-coded, constant, or substantially constant. In other embodiment, the value of the randomness level parameter 135 may be modified, updated, increased or decreased, optionally in response to the performance of master units 121 and/or 122. The value of the randomness level parameter 135 may represent, for example, the number of bits of the RNG 132 from which the pseudo-random data is obtained by randomizer 131.

In some embodiments, for example, the value of the randomness level parameter may be decreased (e.g., thereby decreasing the number of bits of the RNG 132 from which the random data is obtained), if it is detected that master unit 121 is frequently in "live-lock" or is frequently "starved" (namely, its requests to slave unit 130 are substantially continuously rejected for a pre-defined time period, e.g., approximately one second). Similarly, for example, the value of the randomness level parameter 135 may be decreased (e.g., thereby decreasing the number of bits of the RNG 132 from which the random data is obtained), if it is detected that master unit 122 is frequently in "live-lock" or is frequently "starved" (namely, its requests to slave unit 130 are substantially continuously rejected for a pre-defined time period, e.g., approximately one second). In contrast, the value of the randomness level parameter 135 may be increased (e.g., thereby increasing the number of bits of the RNG 132 from which the random data is obtained), if it is detected that master unit 121 and master unit 122 are not frequently in "live-lock" and are not frequently "starved" (namely, their requests to slave unit 130 are not continuously rejected for a pre-defined time period). Frequent "live-locks" or frequent "starvation" of master unit 121 and/or of master unit 122 may result in a decrease in the value of the randomness level parameter 135; whereas absence of "live-locks" and absence of "starvation" of master units 121 and 122 may result in an increase in the value of the randomness level parameter 135.

The analysis and/or determination to modify (or to maintain) the value of the randomness level parameter 135, and/or the modification of the value of the randomness level parameter 135, may be performed by a modifier 137. The modifier 137 may be implemented as, for example, a software module, a hardware component, a logic or module or component associated with common pipeline 120, a component internal to slave unit 130, a component external to slave unit 130, a component of common pipeline 120, a component external to common pipeline 120, a controller or module that checks for "live-locks" and/or their frequency of occurrence, a controller or module that checks for "starvations" and/or their frequency of occurrence, or the like.

In some embodiments, the number of bits of the RNG 132 from which the random or pseudo-random data is obtained by randomizer 131, is modified or adjusted to achieve specific implementation requirements. For example, the number of bits used by randomizer 131 may be the maximal number of bits for which substantially no live-locks occur with regard to master unit 121 and/or master unit 122. This may allow elimination or significant reduction of live-locks, together with a minimal number of "false" rejections of requests (namely, rejections of requests by the slave unit 130 although the slave unit 130 has resource(s) available for fulfillment).

In some embodiments, the random or pseudo-random mechanism may be implemented, for example, in slave unit 130, in randomizer 131, in another controller or unit or logic associated with slave unit 130, in the common pipeline 120, in a protocol (e.g., a bus protocol) of the common pipeline 120, or the like.

In some embodiments, the random or pseudo-random mechanism that determines that the slave unit 130 rejects a request, randomly or pseudo-randomly, although the slave unit 130 has available resource(s) to fulfill the request, is exclusively performed by the slave unit 130 (or by a slave-side component or logic), and is not performed by (or does not involve operations by or input from) master unit 121, master unit 122, arbiter 125, and/or common pipeline 120.

In some embodiments, the random or pseudo-random rejection of the request by the slave unit 130, although the slave unit 130 has available resource(s) to fulfill the request, is substantially identical in structure and/or format and/or content to the rejection of the request by the slave unit 130 at a time in which the slave unit 130 has available resource(s) to fulfill the request. For example, the rejection of the request by the slave unit 130, although the slave unit 130 has available resource(s) to fulfill the request, need not include additional data, additional information, an indication that the slave unit 130 has available resources to fulfill the request, an indication associated with retrying the request by the master unit(s) 121 and/or 122, or the like.

In some embodiments, the random or pseudo-random rejection of the request by the slave unit 130, although the slave unit 130 has available resource(s) to fulfill the request, is substantially independent from: a priority value associated with the request being rejected; a priority value associated with prior request(s); a priority value associated with master unit 121 and/or master unit 122; priority rules, priority weights, and/or priority parameters.

In some embodiments, the random or pseudo-random rejection of the request by the slave unit 130, although the slave unit 130 has available resource(s) to fulfill the request, does not involve and does not utilize, for example: masking (e.g., temporary masking) or received requests; aggregation or staggering of received requests; commanding (e.g., by the slave unit 130) a master unit to wait for a pre-defined period of time before retrying the request; or notifying a master unit to retry the request when a predefined time period elapses or when a random time period elapses.

In some embodiments, prior to checking the pseudo-random number, the slave unit 130 need not necessarily check whether or not the slave unit 130 has one or more resources available to handle the request. For example, in some embodiments, the slave unit 130 first checks whether or not the slave unit 130 has at least one resource available to handle the request; and only if the checking result is positive, the slave unit 130 proceeds to check whether a pseudo-random condition holds true (e.g., to check whether a pseudo-random value is equal to a prescribed value that triggers rejection). In other embodiments, for example, the slave unit 130 may receive an incoming request, and may avoid checking immediately whether or not the slave unit 130 has at least one resource available to handle the request; instead, the slave unit 130 checks whether a pseudo-random condition holds true (e.g., whether a pseudo-random value is equal to a prescribed value that triggers rejection); if the pseudo-random condition holds true (e.g., if the pseudo-random number is equal to a prescribed value that triggers rejection), then the slave unit 130 rejects the request, without checking whether or not the slave unit has at least one resource available to handle the request; if the pseudo-random condition does not hold true (e.g., if the pseudo-random number is not equal to a prescribed value that triggers rejection), then the slave unit 130 proceeds to check whether or not the slave unit 130 has at least one resource available to handle the request, and accepts or rejects the request based on this checking result. Other schemes, conditions, or combinations or checks may be used by slave 130.

Figure 2:
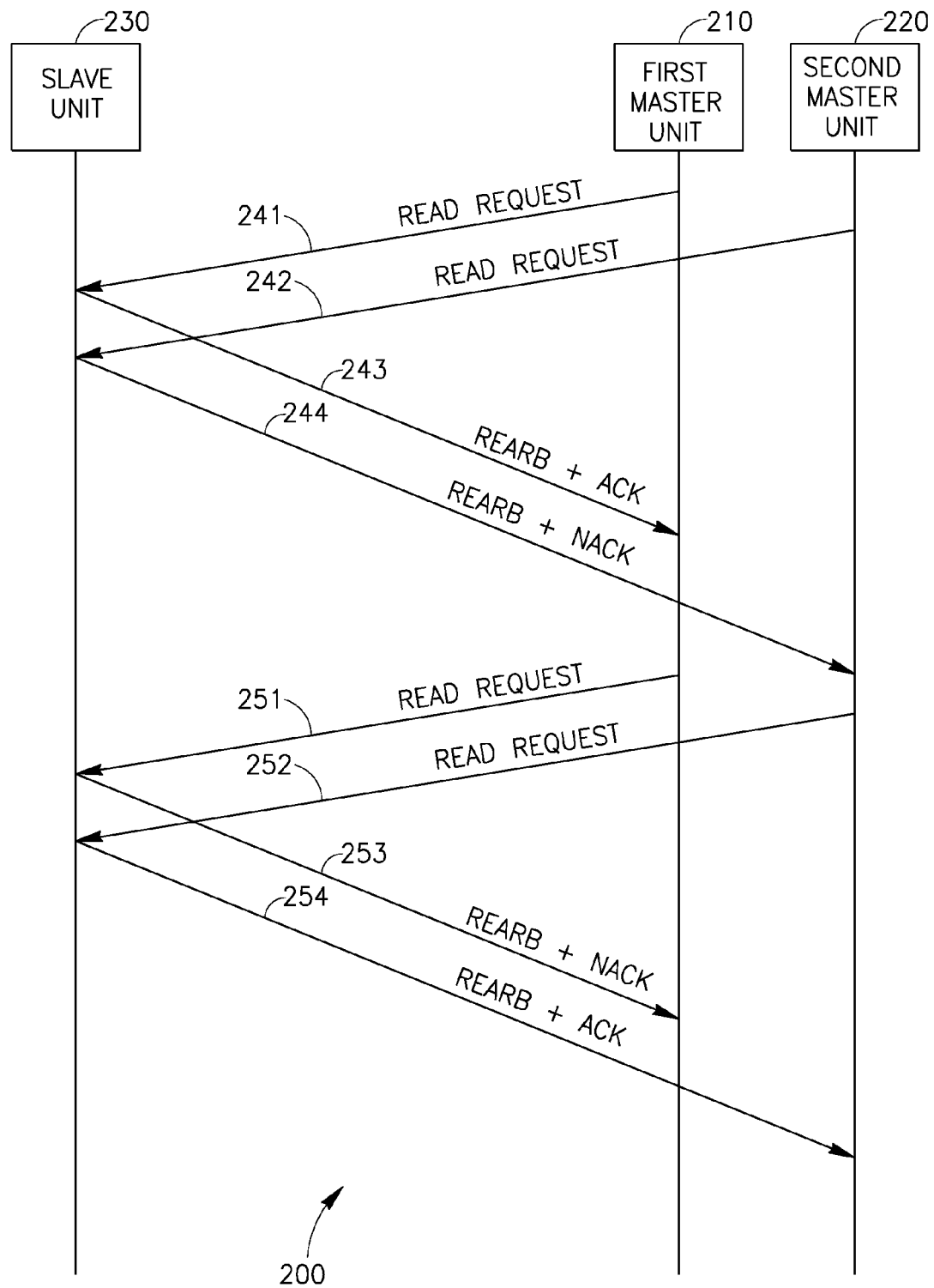
FIG. 2 is a schematic chart of operational sequencing in accordance with a demonstrative embodiment of the invention.

FIG. 2 is a schematic chart of operational sequencing 200 in accordance with some demonstrative embodiments of the invention. A vertical axis 210 indicates operations associated with a first master unit; and a vertical axis 220 indicates operations associated with a second master unit. A vertical axis 230 indicates operations associated with a delayed-transaction slave unit, which serves the first and second master units through a common pipeline; the slave unit is able to support one outstanding operation (e.g., one outstanding read operation) at a time.

The first master unit sends a read request 241 to the slave unit. The slave unit has available resource(s) to handle the read request 241, and thus the slave unit responds to the first master unit with a response 242 that includes re-arbitration (REARB) and acknowledgment (ACK) (e.g., the requested data is sent from the slave unit to the first master unit).

During the time period in which the slave unit handles the read request of the first master unit, the second master unit sends a read request 243 to the slave unit. The slave unit does not have available resource(s) to handle the read request 243, and thus the slave unit responds to the second master unit with a response 244 that includes re-arbitration (REARB) and negative acknowledgment (NACK) (e.g., the requested data is not sent from the slave unit to the second master unit).

Upon fulfillment of the read request of the first master unit, or at a subsequent time, the first master unit sends a further read request 251 to the slave unit. The slave unit has available resource(s) to handle the further read request 251 (e.g., since read request 241 was fulfilled, and read request 242 was rejected). However, in accordance with some embodiments of the invention, the slave unit does not respond to the first master unit with a response that includes re-arbitration (REARB) and acknowledgment (ACK) (e.g., sending the requested data from the slave unit to the first master unit). Instead, based on a random or pseudo-random mechanism or parameter, the slave unit may respond to the first master unit with a response 252 that includes re-arbitration (REARB) and negative acknowledgment (NACK) (e.g., the requested data is not sent from the slave unit to the second master unit).

During the time period in which the slave unit handles (namely, rejects) the read request of the first master unit, the second master unit sends a further read request 253 to the slave unit. This time, the slave unit has available resource(s) to handle the further read request 253 of the second master unit, since the slave unit rejected the further read request of the first master unit. Therefore, the slave unit responds to the second master unit with a response 254 that includes re-arbitration (REARB) and acknowledgment (ACK) (e.g., the requested data is sent from the slave unit to the second master unit).

Figure 3:
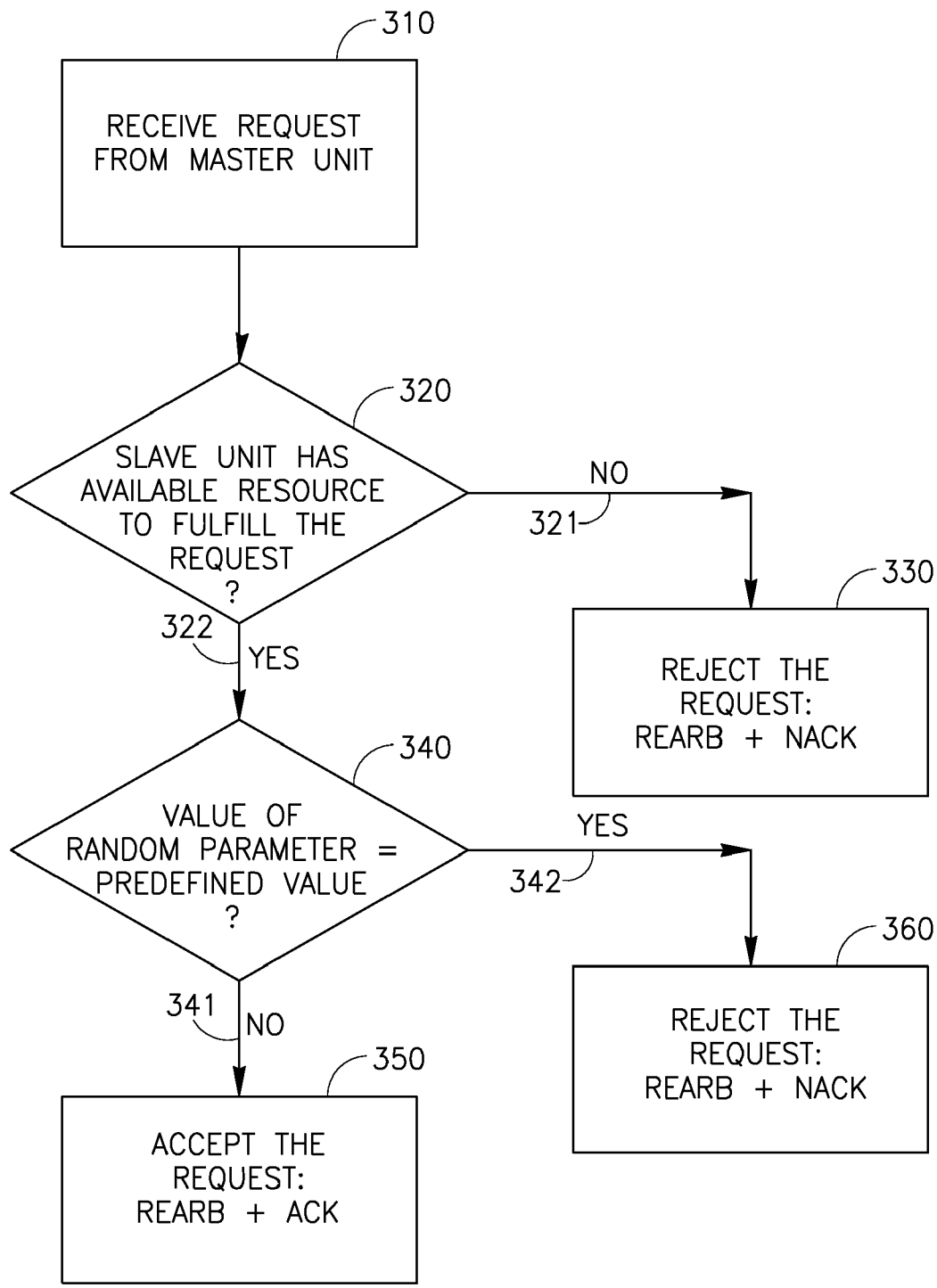
FIG. 3 is a schematic flow-chart of a method of handling delayed transactions in accordance with a demonstrative embodiment of the invention.

FIG. 3 is a schematic flow-chart of a method of handling delayed transactions in accordance with some demonstrative embodiments of the invention. Operations of the method may be used, for example, by system 100 of FIG. 1, by slave unit 130 of FIG. 1, and/or by other suitable units, devices and/or systems.

In some embodiments, the method may include, for example, receiving a read request from a master unit (block 310). The method may further include, for example, checking by the slave unit whether the slave unit has at least one resource available to fulfill the received read request (block 320).

If it is determined that the slave unit does not have any resource available to fulfill the received read request (arrow 321), then the method may include rejecting the read request (block 330), e.g., by sending to the master unit a response that includes re-arbitration (REARB) and negative acknowledgment (NACK) (e.g., the requested data is not sent from the slave unit to the second master unit).

In contrast, if it is determined that the slave unit has one or more resources available to fulfill the received read request (arrow 322), then the method may proceed with the operations of block 340 and onward.

As indicated at block 340, the method may include, for example, checking whether the value of a random or pseudo-random number is equal to a pre-defined or prescribed value that triggers rejection. For example, this may include checking whether a sequence of K bits of a RNG (e.g., a free-running CRC generator) is equal to zero, or whether each bit in the sequence of K bits of the RNG is equal to one; wherein K is a natural number. Other suitable conditions or criteria may be used; for example, instead of checking whether the value of the pseudo-random parameter is equal to a prescribed value, the method may include checking whether the value of the pseudo-random parameter is larger than a prescribed value, is smaller than a prescribed value, is different from a prescribed value, is within a prescribed range, is not within a prescribed range, or the like.

If the value of the pseudo-random number is not equal to the pre-defined value (arrow 341), then the method may include accepting the read request (block 350), e.g., by sending to the master unit a response that includes re-arbitration (REARB) and acknowledgment (ACK) (e.g., the requested data is sent from the slave unit to the second master unit).

In contrast, if the value of the pseudo-random number is equal to the pre-defined value (arrow 342), then the method may include rejecting the read request (block 360), e.g., by sending to the master unit a response that includes re-arbitration (REARB) and negative acknowledgment (NACK) (e.g., the requested data is not sent from the slave unit to the second master unit). This is performed even thought the delayed-transaction slave unit has an available resource to fulfill the read request of the master unit.

Other suitable operations or sets of operations may be used in accordance with embodiments of the invention.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus to handle delayed transactions in a computing system, the apparatus comprising:
    a slave unit adapted to pseudo-randomly reject a request received from a master unit;
    a pseudo-random number generator to generate a pseudo-random value, wherein the slave unit is to pseudo-randomly reject the request if the pseudo-random value is equal to a prescribed value that triggers request rejection;
    a register to store a randomness level parameter, wherein the pseudo-random number generator is to generate the pseudo-random value based on the randomness level parameter;
    and wherein the value of the randomness level parameter is decreased in response to a live-lock of the master unit.

2. The apparatus of claim 1, wherein the value of the randomness level parameter is increased if substantially no live-locks of the master unit occur within a pre-defined time period.

3. A method for handling delayed transactions in a computing system, the method comprising:
    pseudo-randomly rejecting a request received by a slave unit from a master unit, wherein generating the pseudo-random value comprises generating the pseudo-random value based on a randomness level parameter, and further comprising:
    decreasing the value of the randomness level parameter in response to a live-lock of the master unit.

* * * * *